(12) United States Patent
Natu et al.

(10) Patent No.: US 10,091,176 B2
(45) Date of Patent: Oct. 2, 2018

(54) ENHANCED EVPN MAC ROUTE ADVERTISEMENT HAVING MAC (L2) LEVEL AUTHENTICATION, SECURITY AND POLICY CONTROL

(71) Applicant: Juniper Networks, Inc., Sunnyvale, CA (US)

(72) Inventors: Sachin S. Natu, Fremont, CA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 176 days.

(21) Appl. No.: 15/079,981

(22) Filed: Mar. 24, 2016

(65) Prior Publication Data

US 2017/0093834 A1    Mar. 30, 2017

Related U.S. Application Data

(63) Continuation-in-part of application No. 14/871,960, filed on Sep. 30, 2015.

(51) Int. Cl.
*H04L 29/06*      (2006.01)
*H04L 12/28*      (2006.01)
(Continued)

(52) U.S. Cl.
CPC .......... *H04L 63/08* (2013.01); *H04L 12/2852* (2013.01); *H04L 12/4641* (2013.01);
(Continued)

(58) Field of Classification Search
CPC . H04L 12/4642; H04L 12/2852; H04L 45/50; H04L 63/0272; H04L 63/08;
(Continued)

(56) References Cited

U.S. PATENT DOCUMENTS 7,394,820 B1    7/2008 Dianda
8,675,664 B1    3/2014 Kamath et al.
(Continued)

FOREIGN PATENT DOCUMENTS

WO    2014203113 A1    12/2014

OTHER PUBLICATIONS

"BGP MPLS Based Ethernet VPN draft-ietf-l2vpn-evpn-08;".*
(Continued)

*Primary Examiner* — Marsha D. Banks Harold
*Assistant Examiner* — Elton Williams
(74) *Attorney, Agent, or Firm* — Shumaker & Sieffert, P.A.

(57) ABSTRACT

Techniques are described that enable MAC (L2) address authentication within an L2 switching network, such as a metro transport network. Moreover, when used in an EVPN, the techniques provide fine grain policy control over the L2 switching network so as to enable carrier networks to specify and control topologies for transporting packet-based communications. Access routers of the EVPN communicate utilizes enhanced EVPN MAC route advertisements that include an additional attribute indicating a request that L2 network address(es) being advertised be validated by a network address authentication device. A route controller relays the EVPN MAC advertisement upon validation of the L2 networks address. Moreover, the route controller may utilize the EVPN MAC route advertisements to distribute MAC-level policies to control topologies and MAC learning within the EVPN and provide services such as per-MAC traffic quota limits.

29 Claims, 6 Drawing Sheets

(51) Int. Cl.
    *H04L 12/46*     (2006.01)
    *H04L 12/66*     (2006.01)
    *H04L 12/721*    (2013.01)
    *H04L 12/741*    (2013.01)

(52) U.S. Cl.
    CPC .............. *H04L 12/66* (2013.01); *H04L 45/66* (2013.01); *H04L 45/745* (2013.01); *H04L 63/029* (2013.01); *H04L 63/0272* (2013.01); *H04L 63/0876* (2013.01); *H04L 63/162* (2013.01); *H04L 63/20* (2013.01)

(58) Field of Classification Search
    CPC ........... H04L 63/0876; H04L 61/6022; H04W 12/08; H04W 12/06
    See application file for complete search history.

(56) References Cited

U.S. PATENT DOCUMENTS

| | | | |
|---|---|---|---|
| 8,861,345 B2* | 10/2014 | Hares | H04L 29/06 370/229 |
| 9,559,951 B1* | 1/2017 | Sajassi | H04L 45/66 |
| 2010/0177752 A1 | 7/2010 | Aggarwal et al. | |
| 2010/0182984 A1* | 7/2010 | Herscovici | H04L 63/0892 370/338 |
| 2013/0097674 A1 | 4/2013 | Jindal et al. | |
| 2015/0281096 A1* | 10/2015 | Boutros | H04L 47/20 370/231 |

OTHER PUBLICATIONS

Extended Search Report from counterpart European Application No. 16190836.3, dated Apr. 5, 2017, 14 pp.
Response to the Office Action dated Mar. 23, 2017, from U.S. Appl. No. 14/871,960, filed Jul. 21, 2017, 14 pp.
Response to Extended Search Report dated Mar. 3, 2017, from counterpart European Application No. 16190770.4, filed Oct. 2, 2017, 24 pp.
Sajassi et al., "BGP MPLS Based Ethernet VPN draft-ietf-l2vpn-evpn-08," Internet-Draft, Network Working Group, Sep. 12, 2014, 51 pp.
Final Office Action from U.S. Appl. No. 14/871,960, dated Oct. 3, 2017, 20 pp.
Extended Search Report from counterpart European Application No. 16190770.4, dated Jan. 3, 2017, 8 pp.
Rigney et al., "Remote Authentication Dial In User Service (RADIUS)," RFC 2865, Jun. 2000, 76 pp.
Fajardo et al., "Diameter Base Protocol," RFC 6733, Internet Engineering Task Force (IETF), Oct. 2012, 152 pp.
Sajassi et al., "BGP MPLS-Based Ethernet VPN," RFC 7432, Internet Engineering Task Force (IETF), Feb. 2015, 56 pp.
Zimmermann, "OSI Reference Model—The ISO Model of Architecture for Open Systems Interconnection," IEEE Transactions on Communications, vol. Com-28, No. 4, Apr. 1980, pp. 425-432.
Bates et al., "BGP Route Reflection: An Alternative to Full Mesh Internal BGP (IBGP)," RFC 4456, Network Working Group, Apr. 2006, 12 pp.
Sajassi et al., "BGP MPLS Based Ethernet VPN," Network Working Group Internet Draft, draft-ietf-l2vpn-evpn-11, Oct. 18, 2014, 52 pp.
Partial European Search Report from counterpart European Application No. 16190836.3, dated Jan. 10, 2017, 7 pp.
Office Action from U.S. Appl. No. 14/871,960, dated Mar. 23, 2017, 19 pp.
Response to European Search Report dated Apr. 5, 2017, from counterpart European Application No. 16190836.3, filed Nov. 2, 2017, 25 pp.
Response filed Dec. 4, 2017 to the final Office Action dated Oct. 3, 2017, 13 pps.
Notice of Allowance from U.S. Appl. No. 14/871,960, dated Jan. 4, 2018, 8 pp.

* cited by examiner

ENHANCED EVPN MAC ROUTE ADVERTISEMENT HAVING MAC (L2) LEVEL AUTHENTICATION, SECURITY AND POLICY CONTROL

This application is a continuation-in-part of U.S. application Ser. No. 14/871,960, filed Sep. 30, 2015, the entire contents of which is hereby incorporated by reference.

TECHNICAL FIELD

The invention relates to computer networks and, more specifically, to delivering security and policy control within layer two (L2) networks.

BACKGROUND

Many metropolitan regions have installed metropolitan (metro) transport networks to provide high-bandwidth connectivity for local subscribers to a larger packet-based service network, such as the Internet. Each subscriber typically contracts with any of a number of Internet service provider (ISP) networks connected to the metro transport network, and each ISP network provides an anchor for communication sessions for the subscribers and manages network services for the subscribers such as authentication, accounting and billing.

The subscribers may utilize a wide variety of devices to connect to the ISP networks to access resources and services provided by the Internet. For example, subscribers typically utilize desktop computers, laptop computers, smart TVs, mobile smart phones and feature phones, tablet computers, and the like. The metro transport network typically provides layer two (L2) switching mechanisms for transporting packet-based data between the subscribers and their respective ISPs such that layer three (L3) communication sessions can be established for the subscribers at the ISPs for communicating with resources beyond the ISP, such as remote content data networks (CDNs) or the Internet.

SUMMARY

In general, techniques are described that provide layer two (L2) network address (e.g., media access control 'MAC' address) authentication within a network, such as a metro transport network. Moreover, the techniques provide fine grain policy control over each of the L2 network addresses using Ethernet Virtual Private Network (EVPN) technology over the metro transport network so as to enable carrier networks to specify and control topologies for transporting packet-based communications.

In one example, a system comprises a metro transport network that provides layer two (L2) packet switching for transporting network packets associated with the customer devices, wherein the metro transport network comprises at least one access router that is connected to the customer devices by one or more access links and a plurality of other routers of the metro transport network, and wherein the access router and the other routers establish an EVPN within the metro transport network. The system further includes a network address authentication device within the metro transport network and comprising a database of valid L2 network addresses for the customer devices. Responsive to receiving a packet from one of the customer devices (e.g., customer premise equipment (CEs) or individual subscriber devices), the access router outputs an authentication request to the network address authentication device of the metro transport network, the authentication request specifying a source L2 network address of the packet and requests validation of the source L2 network address. Responsive to receiving a response message from the network address authentication device indicating that the source L2 network address is a valid L2 network address associated with one of the customer devices, the access router is configured to output an EVPN route advertisement that advertises the L2 network address as reachable through the access router. Responsive to receiving a response message from the network address authentication device indicating that the source L2 network address is an invalid L2 network address (e.g., blacklisted or unknown) not associated with any of the customer devices, the access router is configured to discard the packet with the access router without outputting the EVPN route advertisement into the EVPN.

In another example, a method comprises establishing an EVPN with a set of routers of a metro transport network positioned between at least one Internet service provider network and a set of customer devices, wherein the metro transport network provides L2 packet switching for transporting network packets between the Internet service provider network and the customer devices, and wherein a first one of the routers is an access router coupled to the customer devices by an access link. The method further comprises receiving, with an access router, a packet from one of the customer devices by the access link and, responsive to receiving the packet, outputting an authentication request from the access router to a network address authentication device of the metro transport network, wherein the authentication request specifies a source L2 network address of the packet and requests validation of the source L2 network address. The method comprises, responsive to receiving the response messaging indicating that the source L2 network address is a valid L2 network address associated with one of the customer devices, outputting, within the EVPN by the access router, an EVPN route advertisement that advertises the L2 network address as reachable through the access router.

In another example, an access router of a metro transport network comprises a control unit having at least one processor coupled to a memory. The control unit executes software configured to establish an EVPN with a set of other routers within a metro transport network that provides L2 packet switching for transporting network packets associated with customer devices. The control unit is configured to, responsive to receiving a packet from one of the customer devices over the access link, output an authentication request to a network address authentication device of the metro transport network, the authentication request specifying a source L2 network address of the packet and requesting validation of the source L2 network address. Responsive to receiving a response message from the network address authentication device indicating that the source L2 network address is a valid L2 network address associated with one of the customer devices, the access router outputs an EVPN route advertisement that advertises the L2 network address as reachable through the access router. Responsive to receiving a response message from the network address authentication device indicating that the source L2 network address is an invalid L2 network address not associated with any of the customer devices, the access router discards the packet with the access router without outputting the EVPN route advertisement into the EVPN.

In another example, a metro transport network that provides layer two (L2) packet switching for transporting network packets associated with the customer devices, wherein the metro transport network comprises at least one access router that is connected to the customer devices by one or more access links and a plurality of other routers of the metro transport network, and wherein the access router and the other routers establish an Ethernet Virtual Private Network (EVPN) within the metro transport network. A route controller within the metro transport network relay routes between the routers, wherein the route controller is coupled to network address authentication device comprising a database of valid L2 network addresses for the customer devices. Responsive to receiving a packet from one of the customer devices by the access link, the access router outputs to the route controller an EVPN MAC route advertisement that advertises an L2 network address of the packet as reachable through the access router, wherein the EVPN MAC route advertisement include a request for validation of the L2 network address by the network address authentication device.

In another example, a method comprises establishing an Ethernet Virtual Private Network (EVPN) with a set of routers of a metro transport network positioned between at least one Internet service provider network and a set of customer devices, wherein the metro transport network provides layer two (L2) packet switching for transporting network packets between the Internet service provider network and the customer devices, and wherein a first one of the routers is an access router coupled to the customer devices by an access link. The method further comprises receiving, with access router, a packet from one of the customer devices by the access link; and responsive to receiving the packet, outputting by the access router an EVPN MAC route advertisement that advertises an L2 network address of the packet as reachable through the access router, wherein the EVPN MAC route advertisement include a request to validate the L2 network address.

In another example, a route controller comprising a control unit having at least one processor coupled to a memory. The control unit executes software configured exchange routes between a set of routers that have established an Ethernet Virtual Private Network (EVPN) within a metro transport network that provides layer two (L2) packet switching for transporting network packets associated with customer devices. Moreover, the route controller comprises a database of valid L2 network addresses for the customer devices and, responsive to receiving an EVPN MAC route advertisement that advertises an L2 network address as reachable through one of the access routers, accesses the database of valid L2 network addresses for the customer devices and relays the EVPN MAC route advertisement to other ones of the set of routers when the L2 network address specified by the EVPN MAC router matches one of the valid L2 network addresses specified within the database.

In another example, a non-transitory computer-readable storage medium comprises executable instructions configured to perform the methods described herein.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
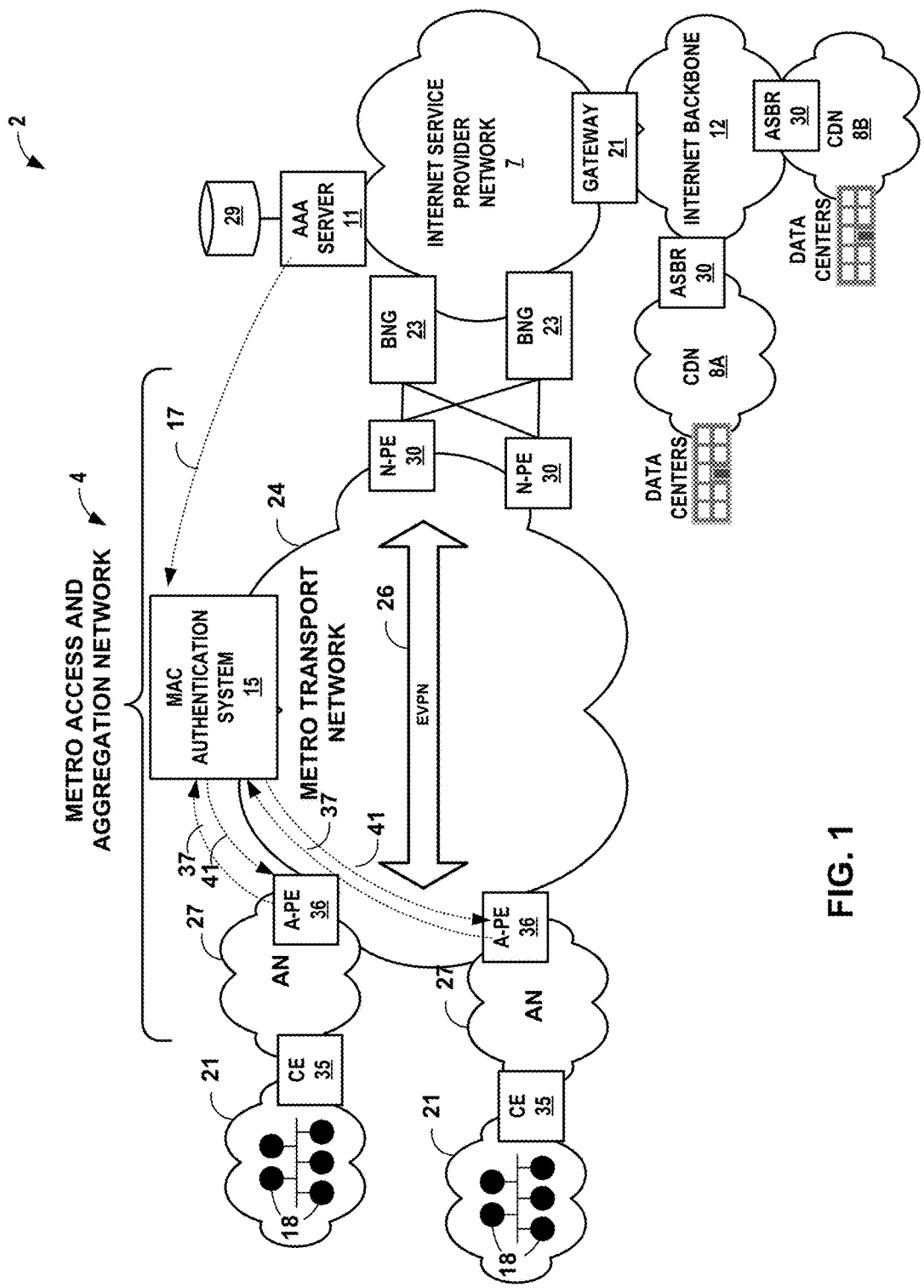
FIG. 1 is a block diagram illustrating an example network system in accordance with various techniques described herein.

FIG. 1 is a block diagram illustrating an example network system 2 in accordance with various techniques described herein. As shown in the example of FIG. 1, network system 2 includes a metro access and aggregation network 4 that is coupled to an Internet service provider network 7.

In general, Internet service provider network 7 is typically owned by an Internet Service Provider (ISP) and operated as a private network that provides packet-based network services to subscriber devices 18. As shown in FIG. 1, subscriber devices 18 are typically interconnected by a layer two network 21 provider by customer premise equipment (CE) 35, such as a local Ethernet switch, cable modem, router or the like. In general, the techniques described herein may be applied to perform MAC-level security and subscriber management with respect to CEs 35, subscriber devices 18 or combinations thereof. For example, in some cases, CE 35 is a pure L2 device that switches L2 packets sourced by subscriber devices 18 such that MAC-level authentication and security is applied to MACs of the subscriber devices. In other examples, CE 35 includes L3 functionality (e.g., routing and optional network address translation (NAT)) such that MAC addresses of CEs 35 are authenticated.

As examples, subscriber devices 18 may be personal computers, laptop computers or other types of computing devices associated with subscribers, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

As other examples, subscriber devices 18 may include a collection of low power, network-enabled devices, such as cameras, sensors, thermostats, controllers, automated lights, appliances or other devices within a home or work place. Such devices may be referred to colloquially as belonging to the "Internet of Things." Other examples of such devices may be traffic lights, cameras, and sensors deployed within a metropolitan environment.

In any event, Internet service provider network 7 typically provides authentication and establishment of CEs 35 such that subscriber device 18 may begin exchanging data packets with resources available on Internet backbone 12, such as content data networks (CDNs) 8A, 8B (herein CDNs 8). In general, each CDN 8 is typically a private network of interconnected devices that cooperate to distribute content to clients using one or more services. Such content may include, for instance, streaming media files, data files, software downloads, documents, and database query results, among others. Accordingly, examples of services offered by CDN 8 may include hyper-text transfer protocol (HTTP), HTTP-based adaptive streaming, Real-Time Streaming Protocol (RTSP) streaming, other media streaming, advertising, file transfer protocol (FTP), and others.

In the example of FIG. 1, metro transport network 24 provides layer two (L2) transport services for network traffic associated with subscriber devices 18. Metro transport network 24 typically includes internal switching and transport nodes, such as Ethernet switches and underlying transport systems for transporting, multiplexing and switching communications through high-speed links between access provider edge routers (A-PEs), 36 and network provider edge routers (N-PEs) 30. Although, for simplicity, only a single Internet service provider network 7 is shown, metro transport network 24 may provide metro access, aggregation and transport of packets for subscriber devices 18 of a plurality of different Internet service providers. In general, metro transport network 24 is typically owned and operated by a metro carrier while each of Internet service provider networks 7 may be owned and operated by a separate Internet service provider.

In this example of FIG. 1, A-PEs 36 operate at the border of metro transport network 24 and provide connectivity for access networks (ANs) 27. In general, ANs 27 provide subscriber devices 18 with access to metro transport network 24 by way of CEs 35. A-PEs 36, for example, typically include functionality to aggregate output from CEs 35 associated with subscriber devices 18 into a higher-speed uplink to metro transport network 24. For example, subscriber devices 18 may connect to local customer premise equipment (CPE) such as DSL or cable modems CPEs may utilize a Point-to-Point Protocol (PPP), such as PPP over ATM or PPP over Ethernet (PPPoE), to communicate BNGs 23 via connectivity provided by A-PEs 36 and N-PEs 30. In other embodiments, CEs 35 may utilize a non-PPP protocol such as Ethernet and DHCP to communicate with BNGs 23 by connectivity provided by A-PEs 36 and N-PEs 30. Other embodiments may use other lines besides DSL lines, such as cable, Ethernet over a T1, T3 or other access links.

In the example of FIG. 1, subscriber devices 18 are associated with customers of an Internet service provider that owns and operates Internet service provider network 7. As such, Internet service provider network 7 receives network access requests from CEs 35 and handles authentication and session establishment of user credentials so as to provide network access to subscriber devices 18. Broadband network gateways (BNG) 23 provide routing and switching functions for connectivity to metro transport network 24 via N-PEs 30 and provide endpoints for and management of IP sessions established for CEs 35. In another example, BNGs 23 may be Broadband Remote Access Servers (BRASs) or other routing devices that provide anchor points for subscriber sessions.

AAA server 11 operates as a subscriber management system that includes database 29 having entries that specify valid user credentials (e.g., user ID and password or MAC addresses of CEs 35) for individual subscribers associated with subscriber devices 18 along with L2 network addresses assigned to the subscriber devices. Further, for each entry, database 29 may specify policies for each L2 network address to provide policy-driven controls for metro transport network 24. Upon authenticating a network access request from a subscriber device 18, AAA server 11 assigns a layer three (L3) network address (e.g., a private IPv4 or IPv6 network address) from the IP domain of the service provider for receiving data services through Internet service provider network 7. As an example, AAA server 11 of Internet service provider network 7 is typically an authentication, authorization and accounting (AAA) server to authenticate the credentials of a subscriber requesting a network connection. The AAA server 11 may be, for example, a Remote Authentication Dial-In User Service (RADIUS) server or a DIAMETER server.

As shown in FIG. 1, metro transport network 24 implements an Ethernet Virtual Private Network (EVPN) 26. Although described with respect to EVPN 26, in another example implementation metro transport network 24 may implement a virtual LAN service (VPLS) or other mechanisms for implementing L2 transport services.

In this example, edge routers of metro transport network 24 (e.g., A-PEs 36 and NPEs 30) operated by the metro transport carrier are configured to execute the EVPN protocol within their respective control planes (also referred to as routing engines) to communicate with each other and exchange configuration information necessary to establish and maintain EVPN 26. When an EVPN is deployed, L2 address learning (e.g., MAC learning) between the edge routers occurs in the control plane by exchanging EVPN messages according to the EVPN protocol, in contrast to traditional bridging that occurs in VPLS in which L2 address learning occurs in the data plane (e.g., forwarding components) while forwarding L2 traffic. For example, control planes of A-PEs 36 and N-PEs 30 are configured to execute a routing protocol, such as the Border Gateway Protocol (BGP), to exchange enhanced messages so as to communicate with each other regarding EVPN 26. That is, control planes of A-PEs 36 and N-PEs 30 may execute the BGP protocol to exchange BGP messages for MAC address signaling/learning as well as for access topology and VPN endpoint discovery with respect to EVPN 26. A-PEs 36 and N-PEs 30 may be connected by an MPLS LSP infrastructure or may be connected by an IP infrastructure in which case IP/GRE tunneling or other IP tunneling can be used to transport L2 communications through EVPN 26. Additional information with respect to the EVPN protocol is described in "BGP MPLS Based Ethernet VPN," RFC 7432, Internet Engineering Task Force (IETF), Jul. 2, 2014, the entire contents of which are incorporated herein by reference. Reference to network layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

After authentication and establishment of network access through Internet service provider network 7, any one of subscriber devices 18 may begin exchanging data packets with resources on Internet backbone 12, such as CDNs 8. During this process, the private IP addresses assigned by Internet service provider network 7 to subscriber devices 18 may be translated to public addresses associated with routing prefixes of Internet service provider network for purposes of packet-based communication on Internet backbone 12. Moreover, gateway 21 provides layer three (L3) routing functions for reaching subscriber devices 18 through Internet service provider network 7. That is, gateway 21 advertises L3 reachability information (e.g., routes) for reaching the public address prefixes associated with Internet service provider network 7. Although not shown, Internet service provider network 7 may include other devices to provide other services, such as security services, load balancing, billing, deep-packet inspection (DPI), and other services for traffic traversing Internet service provider network.

In the example of FIG. 1, when providing the EVPN 26 service within metro transport network 24, A-PE routers 36 and N-PE routers 30 perform MAC address learning to efficiently forward L2 network communications in system 2. That is, as A-PE routers 36 receive from CE routers 35 Ethernet frames originating from subscriber devices 18, the A-PE routers learn L2 state information for customer networks 21, including MAC addressing information for CEs 35 within the customer networks. A-PE routers 36 typically store the MAC addressing information in MAC tables associated with respective interfaces. As A-PE routers 36 learn the MAC address for CEs 35 local attachment circuits, the A-PE routers utilize MAC address route advertisements of a layer three (L3) routing protocol (i.e., BGP in this example) to share the learned MAC addresses to other member routers of EVPN 26 and to provide an indication that the MAC addresses are reachable through the particular PE router that is issuing the route advertisement. In the example of a BGP EVPN, each of A-PE routers 36 advertises the locally learned MAC addresses to the other A-PE router 36 and to remote N-PE routers 30 using a BGP route advertisement, also referred to herein as a "MAC route" or a "MAC Advertisement route," i.e., a Type 2 BGP EVPN route advertisement. As further described below, a MAC route typically specifies one or more individual MAC addresses for respective CEs 35 along with additional forwarding information, such as a route descriptor, route target, layer 2 segment identifier, and MPLS label. In this way, A-PE routers 36 use BGP routing protocol messages to advertise and share the MAC addresses learned when forwarding into EVPN 26 layer two communications received from local attachment circuits of access networks 27. Further example details of the format of an EVPN MAC Route advertisement are described in BGP MPLS Based Ethernet VPN, RFC 743, Network Working Group of the Internet Engineering Task Force (IETF), Oct. 18, 2014, the entire contents of which are incorporated herein by reference.

In accordance with the techniques described herein, metro transport network 24 provides enhanced security by enabling authentication of L2 network addresses (e.g., MAC address) of CEs 35 (or optionally individual subscriber devices 18) prior to advertising the L2 network addresses into EVPN 26. In the example of FIG. 1, MAC authentication system 15 is programmed with data specifying the MAC addresses for any of the Internet service provider networks 7 for which the ISP has agreed to participate in the local MAC authentication and policy control techniques described herein. In particular, AAA servers or other subscriber management systems of participating ISP, such as AAA server 11, output communications 17 to replicate or otherwise communicate authorized L2 network addresses, e.g., MAC addresses, of CEs 35 associated with subscribers with MAC authentication system 15 owned and operated by the metro carrier. For example, AAA server 11 and MAC authentication system 15 may participate in database-level replication and synchronization to communicate the MAC addresses. As additional example, various communication protocols could be used to communicate the MAC addresses between the database of AAA server 11 and MAC authentication system 15. In this way, MAC authentication system 15 is pre-populated with MAC addresses allocated to and owned by ISP providers.

Upon receiving Ethernet frames from local attachment circuits of access networks 27, A-PEs 36 output authentication requests 37 to MAC authentication system 15, which serves as a central database storing information specifying valid MAC addresses. Response messages 41 received from MAC authentication system 15 provide an indication as to whether one or more MAC addresses are valid and authenticated or rejected as invalid (e.g., blacklisted or unknown) MAC addresses. Based on response messages 41, A-PEs 36 process Ethernet frames received from local subscriber devices 18 by way of attachment circuits and CE devices 35. In particular, A-PEs 36 process Ethernet frames having authenticated source MAC addresses by encapsulating the Ethernet frames and forwarding the traffic into EVPN 26 of metro transport network 24. Further, A-PEs 36 only advertises the locally learned MAC addresses to the other A-PE router 36 and to remote N-PE routers 30 for which response messages 41 indicate as valid, authenticated MAC addresses. In other words, A-PEs 36 output BGP route advertisements, also referred to as EVPN "MAC routes" or as "MAC Advertisement routes," i.e., a Type 2 BGP EVPN route advertisement, for those MAC addresses expressly authenticated by MAC authentication system 15.

Moreover, the techniques provide fine grain, MAC-level policy control over EVPN 26. For example, in addition to communicating valid MAC addresses, AAA server 11 may also communicate, for each of the MAC addresses, one or more policies for each L2 network address, thereby enabling policy-driven controls locally at metro transport network 24. In turn, MAC authentication system 15 relays the respective, MAC-specific policy or policies to A-PEs 36 upon authenticating a MAC address. For example, MAC authentication system 15 may format response message 41 as a Radius or Diameter message. In addition to including data providing a response as to the validity of a MAC address, response message 41 is constructed to embed policies to be applied by the A-PE 36 with respect to the MAC address. Policies may be embedded, for example, as vendor-specific attributes (VSA) in a Radius or Diameter compliant response message. Examples of the RADIUS protocol for AAA are described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865"). Examples of the Diameter protocol for AAA are described in Fajardo et al., "Diameter Base Protocol," Network Working Group of the Internet Engineering Task Force (IETF), Request for Comments RFC 6733, October 2012.

As one example, MAC authentication system 15 may construct response message 41 to include time- and/or volume-based policies for the MAC address. For example, upon authenticating a valid MAC address, MAC authentication system 15 may embed a VSA in specifying a duration or traffic quota for which A-PE 36 is to keep the MAC address current in its local MAC table and/or cache of authenticated MACs. As such, any additional traffic having the MAC address as a source MAC triggers a re-authentication request 37.

As another example, MAC authentication system 15 may include in response message 41 time- and volume-based policies for the MAC address. For example, MAC authentication system 15 may include designated Route Target (RT) value using a VSA. In this case, the receiving A-PE 36 utilizes the Route Target in the EVPN Type 2 route when announcing, in the control plane, that MAC address into EVPN 26. In this way, the RT specifies to other EVPN PE routers whether the EVPN PE routers are to import that specific MAC route by inserting the MAC address into their respective MAC tables associated with EVPN 26 as reachable through the advertising A-PE 36. As such, metro transport network 24 enables automatic policy-driven control of which PEs in a metro network are to learn which MAC addresses, and such control is provided at individual MAC level granularity. Moreover, such control is extended to the individual ISPs that own and operate Internet service provider networks 7 and that provide configuration information and policies to MAC authentication system 15 by way of communications 17. By allowing RTs to be automatically configured from MAC authentication system 15 at the granularity of MAC addresses, service/topology customization at the granularity of MAC addresses can be implemented and controlled by the metro carrier and/or the ISPs.

As another example, MAC authentication system 15 may include in response message 41 a new BGP community attribute that communicates loopback IP addresses of EVPN PEs. The BGP community attribute can be embedded in a new VSA in response message 41. The receiving A-PE 36 utilizes the BGP community attribute in the EVPN Type 2 route when announcing, in the control plane, that MAC address into EVPN 26. This provides another mechanism for specifying and controlling which EVPN PE routers are to import that specific MAC route and would avoid specifying RTs on each of the EVPN PEs.

In this way, the example techniques described herein enable automated, per MAC control on the distribution of MAC routes. Moreover, this enables metro carriers to specify rich topologies for supporting Internet Service Providers at a very granular MAC address level.

Figure 2:
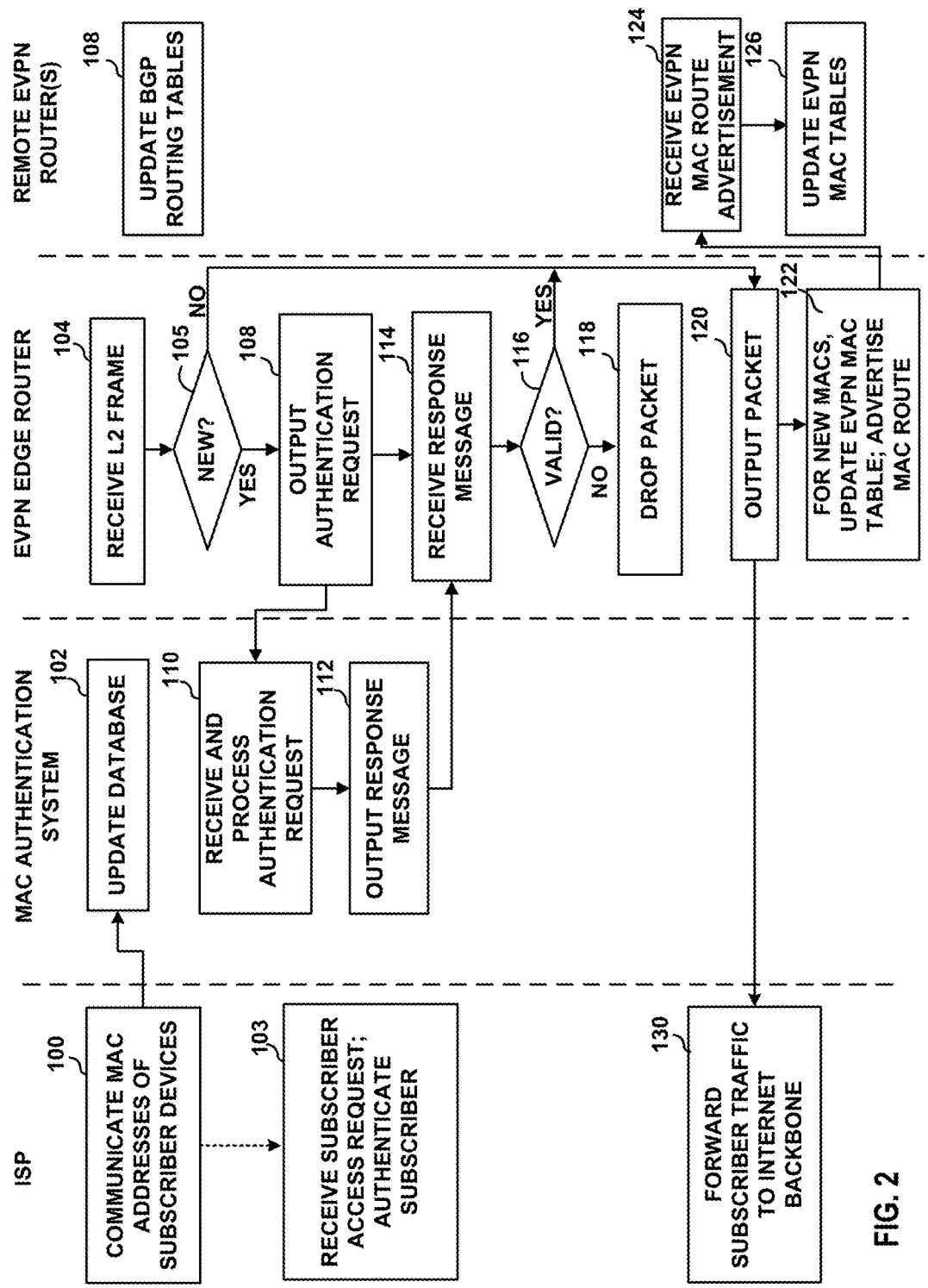
FIG. 2 is a flowchart illustrating example operations of devices of the network system of FIG. 1 in accordance with techniques of the disclosure.

FIG. 2 is a flowchart illustrating example operations of devices of the network system of FIG. 1 in accordance with techniques of the disclosure. Initially, MAC addresses owned by participating ISPs and used by respective CE 35 and/or subscriber devices 18 of the ISPs are communicated to metro carrier for configuration of MAC authentication system 15 (100, 102). MAC authentication system 15 may be programmed by the metro carrier with data specifying the MAC addresses of any of the Internet service provider networks 7 for which the ISP has agreed to participate in the techniques described herein. As other examples, AAA server 11 of the agreeing ISPs may output messages 17 to communicate to MAC authentication system 15 the MAC addresses assigned to the corresponding Internet service provider network 7 and utilized by CEs 35 or, as another example, individual subscriber devices 18. Upon receiving the configuration data, MAC authentication system 15 updates its database of valid MAC addresses (102).

Upon receiving a network access request from a given CE 35, AAA server 11 of Internet service provider network 7 authenticates credentials of the subscriber, e.g., username and password, and allocates an IP address for the subscriber from the IP address prefix assigned to and owned by the ISP (103). At this point, CE 35 typically begins outputting packets, such as L2 Ethernet frames, for accessing network resources, such as CDNs 8 or the Internet.

Upon receiving, via a local attachment circuit, a packet, e.g., an Ethernet frame, from CEs 35 or other device pretending to be an authorized device, A-PE 36 reviews its local cache of recently authenticated MAC addresses and determines whether a source MAC address of the sending subscriber device is a new MAC address that has not previously been learned and, as such, is not present within its local MAC table and has not already been validated (105). If the source MAC address matches a MAC address currently within the local MAC table of A-PE 36, A-PE 36 encapsulates the packet and injects the packet with EVPN 26 (120).

If the MAC address has not already been learned and, therefore, not recently authenticated, A-PE 36 outputs authentication request 37 to MAC authentication system 15, where the authentication requests specifies the source MAC address of the packet, i.e., the MAC address of the sending CE 35 (108). As one example, authentication requests 37 may conform to an enhanced RADIUS or DIAMETER protocol that has been modified to carry the MAC address (es) for which authentication is requested.

MAC authentication system 15 receives authentication request 37 and processes the request by comparing the source MAC address carried by a payload of the authentication request to its central database of valid MAC addresses provided by ISP networks 7 (110). Based on the comparison, MAC authentication system 15 constructs and outputs response message 41 having data indicative of whether the MAC address is a valid MAC address that is expected to be seen from a CE 35 when sourcing L2 packets (112). For example, if MAC authentication system 15 determines that the MAC address matches a MAC address within its database, the MAC authentication system constructs response message 41 to have data indicating the MAC address is a valid source MAC address expected to be seen from a CE 35 (or subscriber device 18). If, however, MAC authentication system 15 determines that the MAC address does not match any of the MAC addresses in its database, the authentication system constructs and outputs response message 41 to include data indicating that the particular MAC address is not valid.

The A-PE 36 that originated authentication request 37 receives response message 41 from MAC authentication system 15 (114) and processes the response message to determine whether the response message indicates the source MAC address for the recently received Ethernet frame is a valid MAC address (116). If response message 41 indicates that the MAC address is an invalid MAC address (e.g., blacklisted or unknown MAC), the requesting A-PE 36 drops the Ethernet frame currently being buffered (118). In addition, the A-PE 36 may put the MAC address on a "blacklist" such that subsequent packets having that same source MAC address are automatically dropped in the forwarding plane for a certain, configurable, amount of time to avoid continuous re-authentication of an invalid MAC address.

In the event that response message 41 indicates that the MAC address is a valid source MAC address for a CE 35 (or subscriber device 18), A-PE 36 encapsulates the Ethernet frame and forwards the resultant packet into EVPN 26 of metro transport network 24 (120). In addition, for any newly learned MAC address, A-PE 36 updates its MAC table associated with EVPN 26 and advertises the locally-learned source MAC address to the other A-PE routers 36 and to remote N-PE routers 30 by way of a Type 2 EVPN MAC route advertisement (122). At this time, A-PEs 36 may apply any policies provided by MAC authentication system 15 for the specific MAC addresses. For example, A-PE 36 may construct the BGP EVPN MAC route advertisement to include a RT or a BGP community, as described above, to specify to other EVPN PE routers whether the EVPN PE routers are to import that specific MAC route.

Remote EVPN routers, such as other A-PEs 36 or N-PEs 30 receive the EVPN MAC route advertisement (124) and, based on RT import rules or BGP community attributes as described herein, update MAC tables associated with the EVPN (126).

Upon receiving outbound Ethernet frames for the subscriber session over EVPN 26 provided by metro transport network 24, BNG 23 provides termination points for the subscribers sessions and applies L3 routing functions to route L3 packets to Internet backbone 12 and CDNs 8 (130).

In the example above, A-PEs 36 are configured to buffer outbound communications until authenticating source MAC addresses within the communications. In an alternative example, A-PEs 36 may be configured to inject a limited amount of communications, such as up to a threshold number of packets, for a given source MAC address while concurrently requesting authentication by MAC authentication system 15. That is, A-PEs 36 may forward the packets while authentication request 37 is pending with MAC authentication system 15. In the event a subsequently received response message 41 indicates that the source MAC address in question is not a valid MAC address then the requesting A-PE 36 adds the MAC address to the blacklist of MAC addresses, automatically drops any subsequent packets having the MAC address as the source MAC address for the packet and does not announce the MAC address into EVPN 26 using an EVPN MAC route advertisement.

Figure 3:
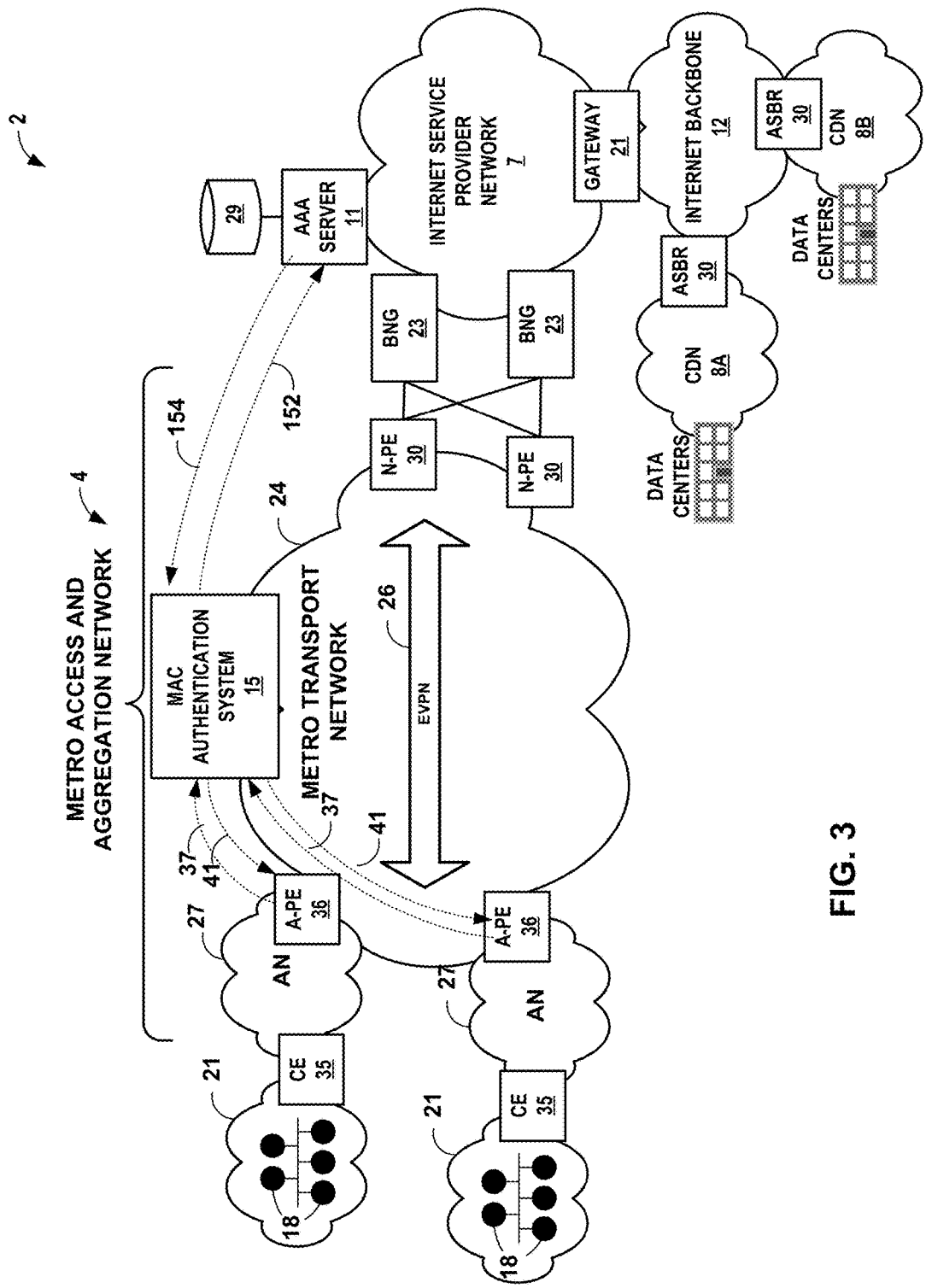
FIG. 3 is a block diagram illustrating another example mode of operation of the network system of FIG. 1 in accordance with various techniques described herein.

FIG. 3 is a block diagram illustrating another example mode of operation of network system 2 in accordance with various techniques described herein. In the example of FIG. 3, MAC authentication system 15 supports tiered authentication and policy control.

For example, rather than, or in addition to, pre-programming MAC authentication system 15 with data specifying the MAC addresses of Internet service provider network 7, the MAC authentication system and AAA server 11 cooperate to provide tiered MAC authentication. That is, MAC authentication system 15 maintains a local cache of recently authenticated MAC addresses and associated policies. Upon receiving an authentication request 37 from an A-PE 36, MAC authentication system 15 compares the source MAC address carried by a payload of the authentication request to its central database of valid MAC addresses and associated policies previously received from ISP networks 7. In the event the MAC address is not found, MAC authentication system 15 issues a query 152 to AAA server 11 of each participating ISP to determine whether such MAC address is valid. Each queried AAA server 11 provides a response 154 having data indicating the MAC address is a valid source MAC address expected to be seen from a CE 35 (or subscriber device 18). Upon receipt of a response message 154 from AAA server 11 of one of Internet service provider networks 7, MAC authentication system 15 updates its local cache of valid MAC addresses and outputs response message 41 having data indicating that the MAC address is a valid MAC address. In addition, response message 154 from AAA server 11 carries any policies to be implemented by metro transport network 24 in association with the particular MAC address. MAC authentication system 15 installs the policies in its database along with the valid MAC address, and constructs response message 41 so as to convey the policies to the requesting A-PE 36.

If, however, MAC authentication system 15 receives response messages 154 from AAA servers 11 of all participating Internet service provider networks 7 that the MAC address does not match any of the MAC addresses in their databases, the MAC authentication system constructs and outputs response message 41 to include data indicating that the particular MAC address is not valid.

Figure 4:
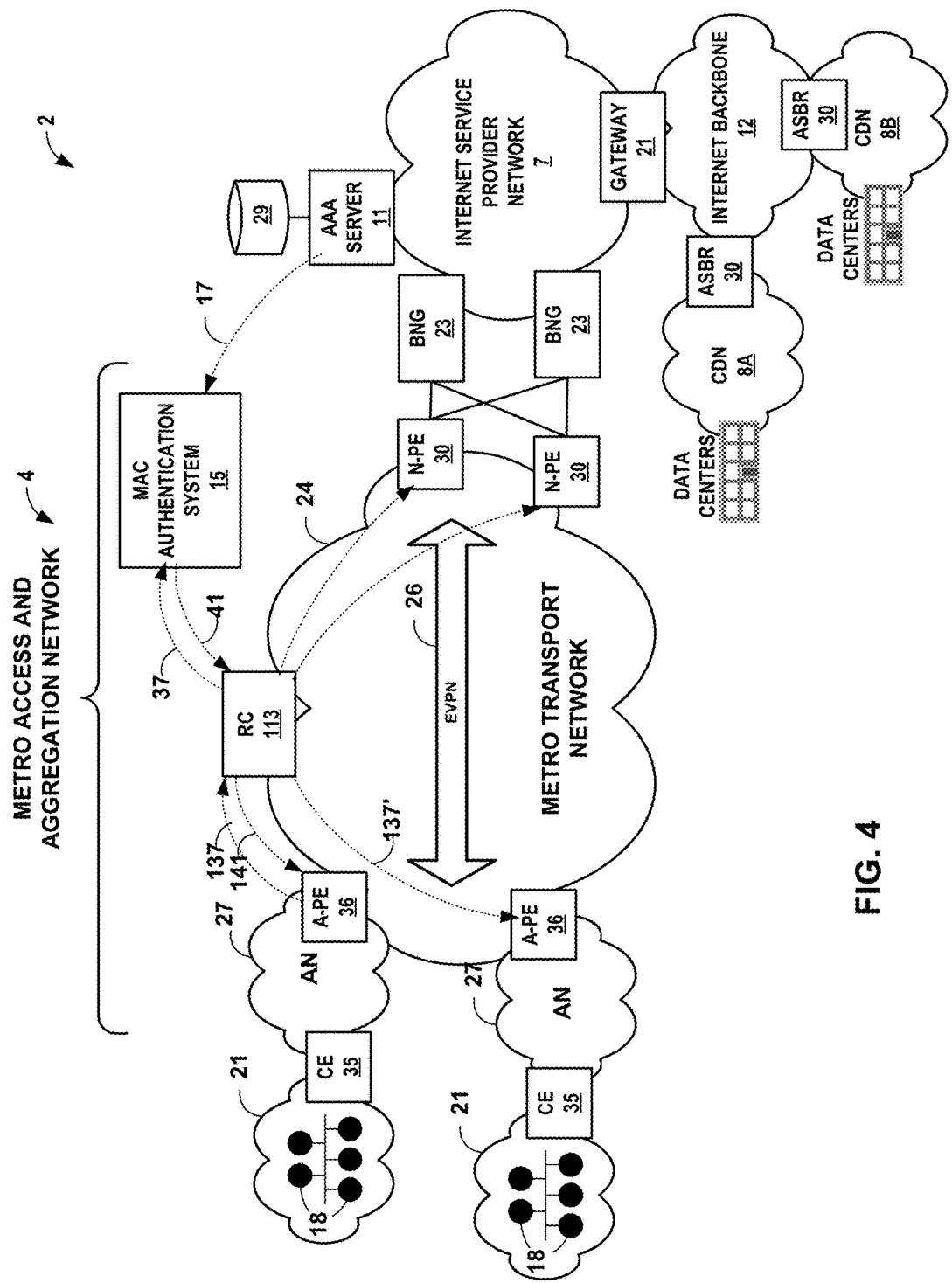
FIG. 4 is a block diagram illustrating another example network system in accordance with various techniques described herein.

FIG. 4 is a block diagram illustrating another example mode of operation of network system 2 in accordance with various techniques described herein.

As shown in FIG. 4, metro transport network 24 includes an enhanced route controller 113 that operates as routing protocol peers to A-PEs 36 to modify and relay route advertisements between the A-PEs. Route controller 113 may, for example, be an enhanced route reflector or route server that operates in accordance with the techniques described herein. In general, route controller 113 comprising a control unit having at least one processor coupled to a memory and other circuitry for executing software instructions so as to implement one or more routing protocols, such as BGP, for exchanging routes with A-PEs. Further example details of a route reflector are described in BGP Route Reflection—An Alternative to Full Mesh IBGP, RFC 4456, Internet Engineering Task Force (IETF), incorporated herein by reference.

In the example of FIG. 4, network system 2 utilizes routing protocol messages, such as enhanced BGP EVPN protocol messages, that have been enhanced to implement the MAC authentication and policy control techniques described herein. For example, rather than send dedicated authentication requests, upon receiving Ethernet frames from local attachment circuits of access networks 27 and learning one or more new MAC addresses for CEs 35 or subscriber devices 18, A-PEs 36 output enhanced EVPN MAC route advertisement 137 to route controller (RC) 113. For example, A-PEs 36 may output enhanced MAC route advertisement 137 as Type 2 EVPN MAC route advertisement that specifies a locally-learned MAC address and that has been enhanced to include an indication that the MAC address requires authentication. As one example, enhanced MAC route advertisement 137 may be a BGP EVPN route advertisement of Type 2 that includes a new BGP attribute or community string, such as a particular Route Target extended community, having a predefined value that is used to indicate that the MAC address requires authentication.

Upon receiving enhanced MAC route advertisement 137 with such an indication, route controller 113 accesses MAC authentication system 15, e.g., by way of an authentication request 37, to request authentication of the one or more MAC addresses. As described herein, MAC authentication system 15 compares the MAC address carried by a payload of the authentication request to its central database of valid MAC addresses and associated policies previously received from ISP networks 7 and, based on the comparison, outputs response message 41 to convey the result of the authentication and any policies to the be applied to the MAC address.

If response message 41 from MAC authentication system 15 indicates that the MAC address is a valid MAC address for a CE 35 or subscriber device 18, route controller 113 forwards the MAC route to other A-PEs 36 of the EVPN. That is, upon authentication of the MAC address being advertised, route controller 113 relays MAC route advertisement 137' to the other A-PEs 36. Prior to relaying MAC route advertisement 137, route controller 113 may remove the BGP attribute or community string originally used to indicate that the MAC address required authentication and may modify the MAC route advertisement to insert a particular route target or BGP community attribute based on any policy specified for the MAC address by MAC authentication system 15. In addition, route controller 113 outputs response message 141 to A-PE 36 that originated the EVPN MAC route advertisement. Response message 141 indicates that the source L2 network address is a valid L2 network address associated with one of the customer devices. Upon receiving response message 151, A-PE 36 that originated the EVPN MAC route advertisement encapsulates the packet and tunnels the packet through the EVPN to one of the other routers of the metro transport network.

In the event that response message 41 indicates that the MAC address is an invalid MAC address (e.g., blacklisted or unknown MAC that does not match a valid MAC address), RR 113 does not relay enhanced MAC route advertisement 137 to other A-PEs 36 of EVPN 23 and, instead, outputs response message 141 to the A-PE 36 that originated the MAC route and indicates that the MAC address within the MAC route is invalid. In response to rejection message 141, the A-PE 36 that originated enhanced MAC route advertisement 137 drops the packet (e.g., Ethernet frame) from which the MAC address was learned without forwarding the packet into EVPN 26. In addition, the A-PE 36 may put the MAC address on a "blacklist" such that subsequent packets having that same source MAC address are automatically dropped in the forwarding plane for a certain, configurable, amount of time to avoid continuous re-authentication of an invalid MAC address.

Although shown separately, route controller 113 and MAC authentication system 15 may be implemented within a single device or distributed across multiple devices.

Figure 5:
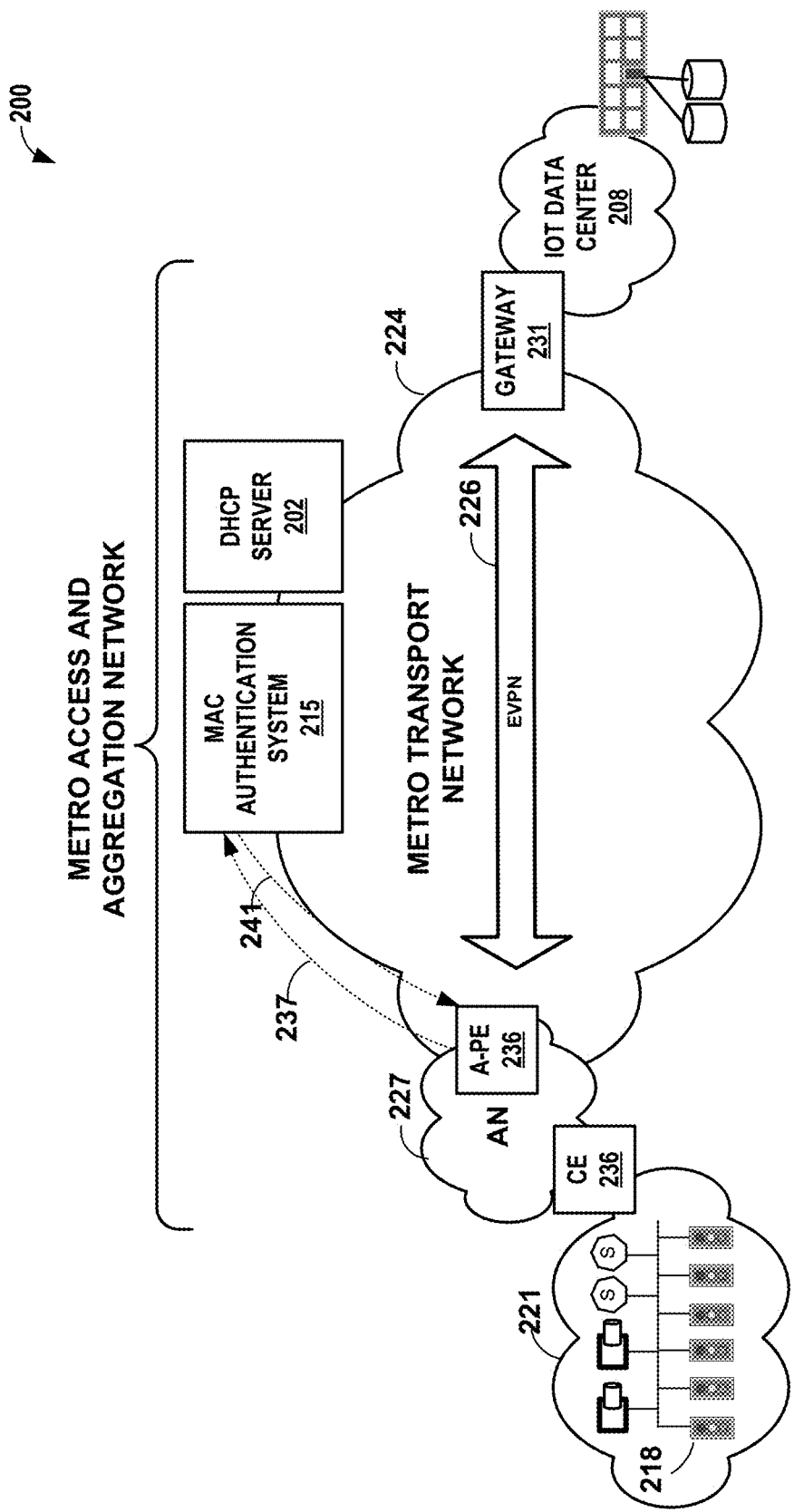
FIG. 5 is a block diagram illustrating another example network system in accordance with various techniques described herein.

FIG. 5 is a block diagram illustrating another example network system 200 that implements various techniques described herein. Similar to metro transport network 24 of FIG. 1, metro transport network 224 implements an Ethernet Virtual Private Network (EVPN) 226 in which edge routers (e.g, A-PE 236 and gateway 231) operated by the metro transport carrier are configured to execute the EVPN protocol within their respective control planes (also referred to as routing engines) to communicate with each other and exchange configuration information necessary to establish and maintain EVPN 226. A-PE 236 and gateway 231 may be connected by an MPLS LSP infrastructure or may be connected by an IP infrastructure in which case IP/GRE tunneling or other IP tunneling can be used to transport L2 communications through EVPN 226.

In the example of FIG. 5, metro transport network 224 includes dynamic host configuration protocol (DHCP) server 202 that assigns network layer (e.g., IP) addresses to subscriber devices 218. Although shown as a standalone device, DHCP server 202 may be integrated within other devices, such as A-PE 236 or gateway router 221. In this way, network system 200 includes a metro transport network 224 that operates as a lightweight, MAC-level subscriber management system. In this example, subscriber devices 218 comprise a collection of devices deployed within a metropolitan region, such as cameras, sensors, and traffic lights. Although described for purposes of example with respect to such devices, the techniques illustrated in reference to FIG. 4 may be applied to other forms of subscriber devices, such as laptops, desktop computers, pagers, smart phones, personal data assistants (PDAs) or the like.

In the example of FIG. 5, CE 237 may be a simple L2 switching device and, in this case, MAC authentication is performed based on MACs of subscriber devices 218. MAC authentication system 215 is programmed with data specifying the MAC addresses of CE 35 and/or subscriber devices 218 and applies local MAC authentication and policy control techniques described herein. That is, similar to the techniques described herein, upon receiving packets from local attachment circuits coupled to CE device 237 of access network 227, A-PE 236 outputs authentication requests 237 to MAC authentication system 215, which serves as a central database storing information specifying valid MAC addresses for metro transport network 224. Response messages 241 received from MAC authentication system 215 provide an indication as to whether source MAC addresses in the packets are valid and authenticated or rejected as invalid MAC addresses. Based on response messages 241, A-PE 236 processes packets (e.g., Ethernet frames) received from local CE 35 by way of the attachment circuits. In particular, A-PE 236 processes packets having authenticated source MAC addresses by encapsulating the packets and forwarding the encapsulated packets into EVPN 226 of metro transport network 224. Further, A-PE 236 only advertises validated MAC addresses to the EVPN routers using, for example, a BGP EVPN Type 2 MAC route advertisement, which may also include an IP address allocated, for example, by a corresponding DHCP server. Moreover, at this time, A-PE 236 may apply any policies provided by MAC authentication system 215 for the specific MAC addresses.

"Internet of Things (IOT)" data center 208 represents a computing system, e.g., a set of servers, configured to control subscriber devices 218, process communications received from the subscriber devices, generate reports based on the communications, and the like. That is, IOT data center 208 may be a computing system configured to control devices installed within a metropolitan environment. As shown in FIG. 1, metro transport network can be configured to enable direct L2 and L3 support for IOT or other subscriber devices 218 without necessarily requiring an intermediate Internet Service Provider. With this lightweight subscriber management system, metro transport networks 224 can behave like a full IP network with many peering/exits points without having to transport all subscriber traffic into centralized BNGs of various ISPs, thus providing more efficient and flexible transport layer services.

Although described with respect to an EVPN, the MAC authentication system may apply the MAC-level authentication techniques described herein to metro transport networks in which a Virtual Private Lan Service (VPLS) is used. In such an implementation, routers of a metro transport network (e.g., metro transport networks 24, 224), including A-PE routers and N-PE routers, establish a VPLS for transporting communications. Upon receiving a response message from the MAC authentication system indicating that a source MAC is a valid MAC associated with one of the customer devices, the A-PE routers forward the packet into the VPLS. However, upon receiving a response message from the MAC authentication system indicating that the source MAC is invalid (e.g., blacklisted or unknown), A-PE routers drop the packet.

Figure 6:
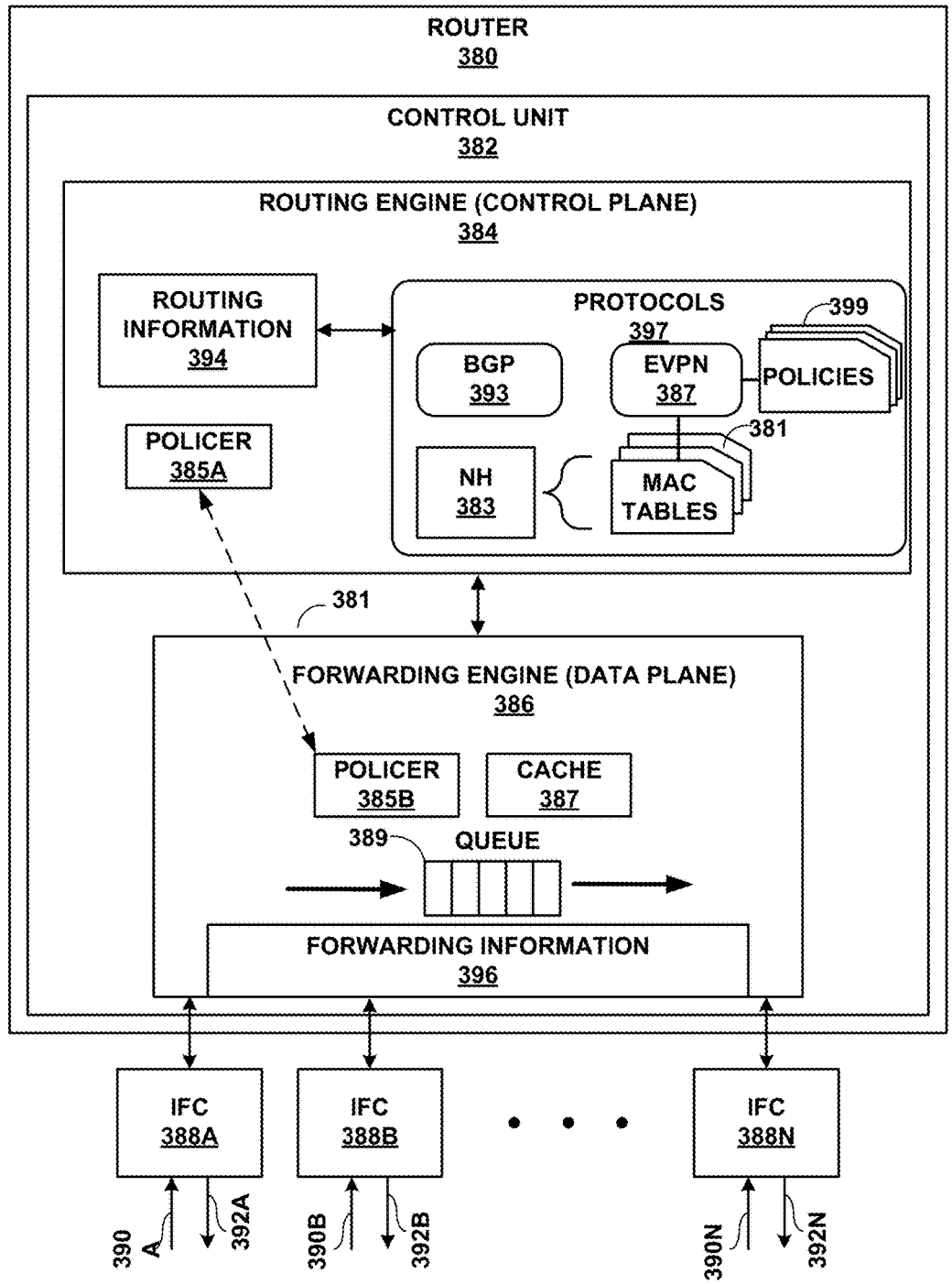
FIG. 6 is a block diagram illustrating further details of an example router in accordance with techniques of the disclosure.

FIG. 6 is a block diagram illustrating an exemplary router 380 capable of performing the disclosed techniques. In general, router 380 may operate substantially similar to A-PEs 36, 236 as described with respect to FIGS. 1-4.

In this example, router 380 includes interface cards 388A-88N ("IFCs 388") that receive packets via incoming links 390A-190N ("incoming links 390") and send packets via outbound links 392A-192N ("outbound links 392"). IFCs 388 are typically coupled to links 390, 392 via a number of interface ports. Router 380 also includes a control unit 382 that determines routes of received packets and forwards the packets accordingly via IFCs 388.

Control unit 382 may comprise a routing engine 384 and a packet forwarding engine 386. Routing engine 384 operates as the control plane for router 380 and includes an operating system that provides a multi-tasking operating environment for execution of a number of concurrent processes. Routing engine 384, for example, executes software instructions to implement one or more control plane networking protocols 397. For example, protocols 397 may include one or more routing protocols, such as Border Gateway Protocol (BGP) 393, for exchanging routing information with other routing devices and for updating routing information 394. Routing information 394 may describe a topology of the computer network in which router 380 resides, and may also include routes through the network. Routing information 394 describes various routes within the computer network, and the appropriate next hops for each route, i.e., the neighboring routing devices along each of the routes. Routing engine 384 analyzes stored routing information 394 and generates forwarding information 396 for forwarding engine 386. Forwarding information 396 may associate, for example, network destinations for subscribers with specific next hops and corresponding IFCs 388 and physical output ports for output links 392. Moreover, forwarding information 396 may specify operations, such as encapsulation with EVPN tags or de-encapsulation of packets, to be applied when forwarding packets to the next hops. Forwarding information 396 may be a radix tree programmed into dedicated forwarding chips, a series of tables, a complex database, a link list, a radix tree, a database, a flat file, or various other data structures.

In the example of FIG. 5, routing engine 384, also referred to as a control plane for router 380, executes EVPN protocol 387, which operates to communicate with other routers to establish and maintain an EVPN, such as the EVPN 26, for transporting communications through metro transport networks so as to logically extend an Ethernet network through the intermediate network. EVPN protocol 387 may, for example, communicate with EVPN protocols executing on remote routers to establish tunnels (e.g., LSPs or GRE tunnels) that utilize label stacks on packets for transporting the packets through the EVPN. EVPN protocol 387 maintains MAC address tables 381 in the control plane of router 380, where the MAC tables associate L2 customer MAC addresses with specific tunnels for reaching the associated MAC addresses. When implementing an EVPN, L2 MAC learning may be performed in the control plane by exchanging, with remote PE devices, BGP messages containing customer MAC addresses. EVPN protocol 387 communicates information recorded in MAC tables 381 to forwarding engine 386 so as to configure forwarding information 396. In this way, forwarding engine 386 may be programmed with associations between each tunnel and output interface and specific source customer MAC addresses reachable via those tunnels. Additional example information with respect to the EVPN protocol is described in "BGP MPLS Based Ethernet VPN," RFC 7432, Internet Engineering Task Force (IETF), Jul. 2, 2014, the entire contents of which are incorporated herein by reference.

In this example, router 380 includes policer 385A executing in the control plane 384 in communication with policer component 385B executing in the data plane 386. As forwarding engine 386 receives packets over local attachment circuits, i.e., one or more of links 390, from subscriber devices or devices pretending to be an authorized subscriber device, policer 385 reviews local cache 387 of recently authenticated MAC addresses and determines whether a source MAC address of the sending subscriber device is a new MAC address that has not previously been learned and, as such, is not present within its MAC address cache 387 and has not already been validated. If the source MAC address matches a MAC address within the local cache 387, policer 385B directs forwarding engine 386 to encapsulate the packet and inject the packet into EVPN 26 in accordance with forwarding information 396.

If the MAC address has not already been learned and, therefore, not recently authenticated, policer 385B raises an alert to policer 385A, which in turn outputs authentication request 37 to MAC authentication system 15, where the authentication request specifies the source MAC address of the packet, i.e., the MAC address of the sending CE 35 or subscriber device 18. During this time, policer 385B directs the packet to queue 389 until a response is received.

Upon receipt of a response message 41 indicating that access has been granted, policer 385A informs EVPN protocol 387 of the valid MAC address, which in turn causes the EVPN protocol to update MAC table 381 and to direct BGP protocol 393 to construct and output a Type 2 BGP MAC route to advertise the newly learned MAC address to other EVPN member routers. At this time, EVPN protocol 387 may apply any policies 399 provided by MAC authentication system 15 for the specific MAC addresses. For example, EVPN protocol 387 may construct the BGP EVPN MAC route advertisement to include a RT or a BGP community, as described above, to specify to other EVPN PE routers whether the EVPN PE routers are to import that specific MAC route. In addition, policer 385A informs policer 385B of whether or not the buffered packet includes a valid source MAC address, causing policer 385B to either approve the packet for forwarding or discard the packet from queue 389.

The architecture of router 380 illustrated in FIG. 5 is shown for exemplary purposes only. The invention is not limited to this architecture. In other examples, router 380 may be configured in a variety of ways. In one example, some of the functionally of control unit 382 may be distributed within IFCs 388. In another example, control unit 382 may comprise a plurality of packet forwarding engines operated as slave routers.

Control unit 382 may be implemented solely in software, or hardware, or may be implemented as a combination of software, hardware, or firmware. For example, control unit 382 may include one or more processors which execute software instructions. In that case, the various software modules of control unit 382 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   establishing an Ethernet Virtual Private Network (EVPN) with a set of routers of a metro transport network positioned between at least one Internet service provider network and a set of customer devices, wherein the metro transport network provides layer two (L2) packet switching for transporting network packets between the Internet service provider network and the customer devices, and wherein a first one of the routers is an access router coupled to the customer devices by an access link;
   receiving, with the access router, a packet from one of the customer devices by the access link; and
   responsive to receiving the packet, outputting by the access router and within the EVPN, an EVPN MAC route advertisement that advertises an L2 network address of the packet as reachable through the access router, wherein the EVPN MAC route advertisement includes a request to validate the L2 network address.

2. The method of claim 1, wherein outputting an EVPN MAC route advertisement comprises constructing the EVPN MAC route advertisement as a routing protocol message having an additional routing attribute or community string to indicate that authentication is required for the L2 network address being advertised.

3. The method of claim 1, wherein the routing protocol message comprises a Border Gateway Protocol (BGP) routing protocol message of Route Type 2.

4. The method of claim 1, further comprising responsive to receiving a response message indicating that the source L2 network address is a valid L2 network address associated with one of the customer devices, forwarding the packet into the EVPN by encapsulating, with the access router, the packet and tunneling the packet through the EVPN to one of the other routers of the metro transport network.

5. The method of claim 4, wherein the response message specifies a policy associated with the L2 network address, the policy specifying an attribute that controls which of the other routers are to import the L2 network address into their respective L2 network address tables associated with the EVPN.

6. The method of claim 5, wherein the attribute specifies a designated Route Target (RT) value or a Border Gateway Protocol (BGP) routing community.

7. The method of claim 1 further comprising responsive to receiving a response messaging indicating that the source L2 network address is an invalid L2 network address that is not associated with one of the customer devices, discarding the packet with the access router.

8. The method of claim 1, further comprising:
   receiving the EVPN MAC route advertisement with a route controller within the metro transport network;
   responsive to determining the EVPN MAC route advertisement includes the request to validate the L2 network address, accessing a database of valid L2 network addresses for the customer devices; and
   relaying the EVPN MAC route advertisement from the route controller to other ones of the set of routers of the metro transport network that established the EVPN when the L2network address specified by the EVPN MAC router matches one of the valid L2 network addresses.

9. The method of claim 8, further comprising, prior to relaying the EVPN MAC route advertisement, modifying the EVPN MAC route advertisement to specify a policy to be applied to the L2 network address by the set of routers that established the EVPN.

10. The method of claim 8, further comprising, when the L2 network address specified by the EVPN MAC router does not matches one of the valid L2 network addresses, outputting a response message to the access router that output the EVPN MAC route indicating that the L2 network address is invalid without relaying the EVPN MAC route advertisement to other ones of the set of routers of the metro access network that established the EVPN.

11. A system comprising:
    a metro transport network that provides layer two (L2) packet switching for transporting network packets associated with the customer devices, wherein the metro transport network comprises at least one access router that is connected to the customer devices by one or more access links and a plurality of other routers of the metro transport network, and wherein the access router and the other routers establish an Ethernet Virtual Private Network (EVPN) within the metro transport network; and
    a route controller within the metro transport network to relay routes between the routers, wherein the route controller is coupled to network address authentication device comprising a database of valid L2 network addresses for the customer devices,
    wherein responsive to receiving a packet from one of the customer devices by the access link, the access router outputs to the route controller an EVPN MAC route advertisement that advertises an L2 network address of the packet as reachable through the access router, wherein the EVPN MAC route advertisement includes a request for validation of the L2 network address by the network address authentication device.

12. The system of claim 11, wherein the access router is configured to construct the EVPN MAC route advertisement to include an additional routing attribute or community string to indicate that authentication is required for the L2 network address being advertised.

13. The system of claim 12, wherein the EVPN MAC route advertisement comprises a Border Gateway Protocol (BGP) routing protocol message of Route Type 2.

14. The system of claim 11, wherein the route controller, in response to receiving the EVPN MAC route advertisement having the request for validation, accesses the database of valid L2 network addresses for the customer devices and relays the EVPN MAC route advertisement to other ones of the set of routers of the metro access network that established the EVPN when the L2 network address specified by the EVPN MAC router matches one of the valid L2 network addresses specified within the database.

15. The system of claim 14, wherein, prior to relaying the EVPN MAC route advertisement, the route controller modifies the EVPN MAC route advertisement to specify a policy to be applied to the L2 network address by the set of routers that established the EVPN.

16. The system of claim 15, wherein the policy specifies an attribute that controls which of the other routers are to import the L2 network address into their respective L2network address tables associated with the EVPN.

17. The system of claim 16, wherein the attribute comprises a designated Route Target (RT) value or a Border Gateway Protocol (BGP) routing community.

18. The system of claim 14, wherein, when the L2 network address specified by the EVPN MAC route does not matches one of the valid L2 network addresses, the route controller outputs a rejection request to the access router that output the EVPN rejection request without relaying the EVPN MAC route advertisement to the other ones of the set of routers of the metro access network that established the EVPN.

19. The system of claim 11, wherein responsive to receiving a response message from the network address authentication device indicating that the source L2 network address is a valid L2 network address associated with one of the customer devices, the access router that output the EVPN MAC route advertisement encapsulates the packet and tunnels the packet through the EVPN to one of the other routers of the metro transport network.

20. The system of claim 11, wherein responsive to receiving a response message from the network address authentication device indicating that the source L2 network address is an invalid L2 network address, the access router that output the EVPN MAC route advertisement discards the packet.

21. An access router comprising:
a control unit having at least one processor coupled to a memory,
wherein the control unit executes software configured to establish an Ethernet Virtual Private Network (EVPN) with a set of other routers within a metro transport network that provides layer two (L2) packet switching for transporting network packets associated with customer devices,
wherein the control unit is configured to, responsive to receiving a packet from one of the customer devices by the access link, outputs to the route controller an EVPN MAC route advertisement that advertises an L2 network address of the packet as reachable through the access router, and
wherein the EVPN MAC route advertisement includes an additional attribute indicating a request for validation of the L2 network address by a network address authentication device.

22. The access router of claim 21, wherein the EVPN MAC route advertisement comprises a Border Gateway Protocol (BGP) routing protocol message of Route Type 2.

23. The access router of claim 21,
wherein responsive to receiving a response message indicating that the source L2 network address is a valid L2 network address associated with one of the customer devices, the access router is configured to encapsulate the packets and tunnel the packets through the EVPN to one of the other routers of the metro transport network, and
wherein responsive to receiving a response message from the network address authentication device indicating that the source L2 network address is an invalid L2 network address, the access router discards the packet.

24. The access router of claim 21, wherein the customer devices comprise customer premise equipment or subscriber devices.

25. A route controller comprising:
a control unit having at least one processor coupled to a memory;
wherein the control unit executes software configured exchange routes between a set of routers that have established an Ethernet Virtual Private Network (EVPN) within a metro transport network that provides layer two (L2) packet switching for transporting network packets associated with customer devices,
wherein the route controller within the metro transport network comprises a database of valid L2 network addresses for the customer devices,
wherein, responsive to receiving an EVPN MAC route advertisement that advertises an L2 network address as reachable through one of the access routers, the route controller accesses the database of valid L2 network addresses for the customer devices and relays the EVPN MAC route advertisement to other ones of the set of routers when the L2 network address specified by the EVPN MAC router matches one of the valid L2 network addresses specified within the database.

26. The route controller of claim 25, wherein, prior to relaying the EVPN MAC route advertisement, the route controller modifies the EVPN MAC route advertisement to specify a policy to be applied to the L2 network address by the set of routers that established the EVPN.

27. The route controller of claim 26, wherein the policy specifies an attribute that controls which of the routers are to import the L2 network address into their respective L2network address tables associated with the EVPN.

28. The route controller of claim 27, wherein the attribute comprises a designated Route Target (RT) value or a Border Gateway Protocol (BGP) routing community.

29. The route controller of claim 25, wherein the EVPN MAC route advertisement includes an additional attribute indicating a request for validation of the L2 network address by a network address authentication device.

* * * * *